United States Patent Office 2,987,408
Patented June 6, 1961

2,987,408
POZZOLANIC MATERIAL
Leonard John Minnick, Cheltenham, Pa., assignor to G. & W. H. Corson, Incorporated, Plymouth Meeting, Pa., a corporation of Delaware
No Drawing. Filed Mar. 27, 1958, Ser. No. 724,246
18 Claims. (Cl. 106—98)

This invention relates to a novel product, and more specifically to an engineering material which is particularly suitable in combination with Portland cement in providing cementitious mixtures of improved physical and chemical properties which are especially useful in highway construction.

Concrete mixtures for highway construction are subject to rigid specifications for the completed highway must possess certain required properties. For example, the completed highway must have the strength required to withstand repeated heavy loads of the thousands of vehicles passing thereover. In some geographic locations, highways may also be subjected in certain seasons of the year to repeated freezing and thawing conditions. Such weather conditions cause scaling of the surface and progressive deterioration of hardened concrete, which deterioration is promoted if corrosive salts, such as sodium and calcium chloride, are used to aid in ice and snow removal. Thus, a concrete highway in such climates must be made resistant to such deterioration under these climatic conditions.

It is well known that air bubbles of microscopic proportion in hardened concrete add greatly to the resistance to deterioration caused by freezing. Relatively small quantities of air-entraining agents, such as grease, tallow, resinous materials, lignin sulfonates, and the like, if included in a concrete mixture facilitate the incorporation of innumberable small bubbles of atmospheric air during the concrete mixing operation by lowering the surface tension of the mixture. In highway concrete, due to high strength and other requirements, it is essential that proper air entrainment be provided by the use of a minimum of air-entraining agent; thus the use of such agent is rigidly controlled.

It has been suggested to employ fly ash, i.e., the gray, finely divided residues resulting from the burning of pulverized coal and collected from flue gases by electrostatic precipitators, mechanical collectors and the like, in concrete because of certain advantageous properties with which they provide concrete. For example, fly ash aids in overcoming the problem of aggregate growth, whereby aggregates which are reactive with Portland cement cause delayed expansion and cracking of the concrete. Fly ash tends to reduce "bleeding" or segregation of aggregate by which fines and water come to the surface of the concrete. The use of fly ash also reduces the heat of hydration of cement, increases water tightness, i.e., the resistance of concrete to the passage of water, and markedly improves the resistance of concrete to chemical attack.

Although fly ash does provide concrete with the above-mentioned desirable properties, it has certain undesirable properties which make it unsuitable for use in highway concrete construction. As stated before, concrete for highway construction is formed of closely controlled amounts of specific ingredients.

Fly ash is known to have a substantial depressing effect on air entrainment, and thus in order for a concrete containing fly ash to have that resistance to freezing and thawing required of highway concrete, substantially increased amounts of relatively costly air-entraining agent must be employed, which amounts exceed the permitted maximum amount of air-entraining agent.

Water requirement, also, is an extremely important, rigidly controlled factor in highway concrete construction. Fly ash is known to affect water requirement in providing concrete of a given consistency or slump, and different fly ashes will affect water requirement to different degrees. Although it is possible to determine the water requirement for a particular fly ash, as for example in a laboratory, such determination prior to mixing each batch of concrete would be entirely impractical in highway construction where the economics require the placing of tremendous quantities of concrete in a given day. Further, maximum permissible water requirement is strictly specified for highway concrete, and many fly ashes demand that the concrete in which they are employed have a water requirement greater than that permitted by such rigid specifications.

A primary object of this invention is to provide a novel and inexpensive product particularly suitable in combination with Portland cement in providing cementitious mixtures, such as concrete, of improved and controlled physical and chemical properties.

Another object of this invention is the provision of a novel engineering material suitable for combination with Portland cement in providing an improved concrete meeting the rigid requirements of highway concrete.

A further object of this invention is the provision of an inexpensive product, which when employed in combination with Portland cement, provides cement mixtures of the desired consistency or slump with reduced water requirement.

Still another object of this invention is the provision of an engineering material which exhibits high pozzolanic action when employed in cementitious compositions containing lime, Portland cement or both.

Yet another object of this invention is the provision of a novel and inexpensive engineering material from fly ash, which material is particularly suitable in combination with Portland cement in providing cementitious compositions, such as concrete, of improved chemical and physical properties, which compositions are especially suited for highway construction.

A still further object is the provision of a novel cementitious mixture of improved chemical and physical properties, especially suitable for the construction of highways.

These and other objects of this invention will become apparent from a consideration of this specification and claims.

According to this invention there is provided an engineering material particularly suitable in combination with Portland cement and/or lime in providing cementitious compositions and structural products of improved chemical and physical properties consisting essentially of discrete, substantially sphere-like particles having a particle size less than about 200 mesh and a specific gravity of from about 2.1 to about 2.6 and consisting essentially of a glass comprising silica and alumina. Preferably, on the surface of said particles there is a film to promote reaction between lime and the silica-alumina glass comprising a water soluble salt, and at least about 70 percent, by weight, of the particles have a particle size below about 325 mesh, and the particles vary in size from about 200 mesh to sub-micron size. The preferred specific gravity of the engineering material of this invention is about 2.2.

The desirability of including fly ash in highway concrete mixtures and the reasons preventing such use have been discussed herein previously. Unexpectedly, it was found that the engineering material of this invention may be incorporated in concrete mixtures for highway construction to provide those extremely desirable properties afforded by fly ash, such as prevention of undesirable aggregate growth, reduction in bleeding, greater resistance to chemical attack, etc., without the attending disadvantages of fly ash. For example, the novel engineering material has little depressing effect on air-entraining agents so that proper air entrainment can be obtained with those quantities of air-entraining agents permitted in highway concrete mixtures. Because the engineering material has certain specified physical characteristics as regards particle size, particle size distribution, specific gravity, and the like, it is not necessary, prior to mixing each batch of concrete, to determine the effect of the inclusion of the material on water requirement. Thus, the mixing and placing of vast quantities of concrete as required in highway construction may proceed unimpaired. The control of the physical properties of the concrete within narrow limits is attained by the use of the present material. Furthermore, it was found that cementitious mixtures containing the product of this invention have greater strength than similar mixtures which do not contain the product or contain fly ash. In addition water requirement is reduced.

The novel engineering material of this invention comprises a mixture of extremely small, discrete, sphere-like particles, i.e., the particles are tiny globular bodies. The sphere-like particles may all be of substantially the same size, but preferably the mixture of particles presents a size gradient, i.e., the mixture may comprise particles varying in size, with various proportions of particles classified according to a particular size classification. All the sphere-like particles should have a particle size less than about 200 mesh, and preferably, a major portion, for example 70 percent or more, by weight, of the particles of the mixture have a particle size less than about 325 mesh. In a preferred material, the particles vary in size from about 200 mesh to sub-micron size, or less than 1/25,000 in. It is extremely desirable for the engineering material to have a significant proportion of particles, e.g., 5 percent or more, by weight, of particles having a particle size below about 20 microns. The reason for this is that the pozzolanic activity of the material, which activity is more fully described hereinafter, is substantially increased thereby.

Because of the extreme fineness and sphere-like character of the particles forming the engineering material of this invention, water requirement, i.e., the quantity of mixing water required in obtaining a particular consistency or workability is reduced. This reduction in water requirement, of course, is extremely advantageous for the strength of a cement composition varies as the ratio of cement to voids (free water) of the mixture. Since less water is necessary to obtain a desired consistency for a cement composition containing this engineering material, a cement mixture of any suitable consistency will have greater strength than a composition provided with a similar consistency by use of a larger quantity of water, due to the greater free water content of the latter. Further, it appears that the sphere-like particles may improve the grading of the cement fraction of cement mixtures.

The sphere-like particles forming engineering material consist essentially of a glass comprising silica and alumina. In other words, the particles are substantially spherical glass bodies, the glass, to a large degree, comprising silica and alumina. The glass may also comprise significant proportions of iron and alkali and alkaline earth metals such as sodium, potassium, magnesium, and the like. Substantially all of the iron present in the sphere-like particles unites with the alumina and silica in forming an iron-silica-alumina glass, the particles being substantially free of crystalline iron compounds such as magnetite and the like. Thus, the sphere-like particles are substantially non-magnetic.

Pozzolanic materials are generally finely divided siliceous and aluminous substances which are not cementitious themselves, but combine with lime and water to form stable compounds of cementitious value. The silica-alumina glass particles forming the engineering material of this invention are highly pozzolanic, forming strong cementitious materials with lime, such as the lime in Portland cement. According to a preferred form of the invention, the sphere-like particles have a surface film or coating comprising a water soluble salt, which film enhances such pozzolanic action. It is believed that the film etches the silica-alumina glass to promote reaction between the glass and lime.

As is well known, a substantial quantity of free hydrated lime is produced in Portland cement concrete during setting and hardening. By the incorporation of the instant engineering material in cement compositions, the free calcium hydroxide present in the cement mixture reacts with the sphere-like particles, which because of their pozzolanic properties, form stable, cementitious compounds with the free lime. The cement mixture, therefore, has markedly improved resistance to chemical attack. Also, water tightness, i.e., resistance of cement mixtures to the passage of water, is greatly improved. These properties, of course, are extremely desirable in highway concrete where chemicals may be used in snow and ice removal and exposure to water is continual.

The film on the surface of the sphere-like particles may comprise any water soluble salt or mixture of water soluble salts which enhances the pozzolanic properties of the particles. Water soluble salts for this purpose include sulfates, acid sulfates, and mixtures thereof, as for example alkali metal and alkaline earth metal sulfates and acid sulfates, such as sodium, potassium, and magnesium sulfates and acid sulfates. The film is relatively thin as compared to the diameter of the spheres, and because of the small size of the spheres may represent amount, e.g. on the order of a molecular layer. Generally, the film makes up not more than about 2 percent, by weight, of the particle.

The film of water soluble salt may be formed on the surface of the sphere-like particles either during or after formation of the particles. In the first case, as will be more fully described hereafter, alkali and alkaline earth metals and sulfur compounds, such as sulfur trioxide, sulfuric acid and the like, present during the formation of the sphere-like particles react to form a film of a water soluble salt or salts on the particles. However, if the particles are formed in the absence of such film forming materials, the film may be applied thereto by introducing the sphere-like particles into a solution of a salt or mixture of salts which provide the particles with the enhanced pozzolanic properties.

In concrete mixtures the relative proportions of the present product to Portland cement may vary widely in order to obtain advantages through the inclusion of the product. For concrete the present material may make up from about 10 to about 40%, by absolute volume, based on absolute volume of the Portland cement plus the present product. In most concrete mixtures, including highway concrete, aggregate is also employed in an amount between about 3 and about 6 volumes of aggregate per volume Portland cement plus the present product.

Although reference has been made above principally to the use of the present product in preparing highway concrete, the present product is also particularly advantageous for use as a component of light weight structural products, including those set at ambient temperatures and based on Portland cement and those based on lime and requiring high temperatures for setting, where control of physical properties, especially high air content, is necessary. In those light weight concrete products based on Portland cement, what has been said above concerning relative amounts of Portland cement, present product and aggregate also applies, except that the aggregate will be a light weight aggregate. In those light weight structural products based on lime and receiving high temperatures, such as in an autoclave the relative properties of the present product to the lime may range between about 2 and about 10 parts by weight of the former per part by weight of the latter.

A preferred method for manufacturing the building material of this invention employs as a source of raw material pulverized coal. The coal, which preferably has been pulverized to a fineness such that about 80 percent passes through a 200-mesh sieve, is blown into a suitable furnace with primary air, and combustion of the coal particles occurs almost instantly while they are suspended in space. The ash forms as minute, molten globules at temperatures on the order of 2800° F., which congeal into discrete sphere-like particles as they leave the high temperature furnace region. This ash may be separated from the entraining combustion gas stream by an electrostatic precipitator, or a mechanical collector plus an electrostatic precipitator in series. The type of furnace employed for combustion of the pulverized coal can be any one suitable for such purpose, which type furnaces are well known in the art.

The ash resulting from the combustion of pulverized coal is commonly referred to as fly ash. Fly ash, as it comes from the collecting equipment, is a gray powdery substance of such fineness that 100 percent passes through a 16 mesh screen and in excess of 95 percent passes through a 100 mesh screen, and on the order of 75 percent or more passes through a 325 mesh sieve. The particles passing a 325 mesh sieve range downward in size to sub-micron, or less than $\frac{1}{25,000}$ in.

Fly ash is a heterogeneous mixture of different substances of widely varying chemical and physical natures ranging from relatively large, irregular, black cake-like particles to almost transparent sub-micron glassy beads.

Through chemical analysis of various fly ashes it has been determined that on a carbon-free basis, fly ash comprises from about 41–56% $SiO_2$; 20–34% $Al_2O_3$; 5–17% $Fe_2O_3$; 2–7% $CaO$; and 0–6% alkali sulfates and acid sulfates, such as alkali and alkaline earth metal sulfates and acid sulfates. The various proportions of the above-mentioned chemical constituents of the sphere-like particles of fly ash, of course, vary depending upon the chemical composition of the particular pulverized coal employed.

In those fly ashes containing alkaline metal and alkaline earth metal sulfates and/or acid sulfates, these materials are present as a film, previously described, on the surface of the sphere-like particles, condensing on the particles as the particles leave the high temperature furnace region. Certain coals contain significant portions of alkali and alkaline earth metals and sulfur, which combine to form these sulfates and acid sulfates. However, the quantities of these materials in some coals is negligible and thus the resulting sphere-like particles of fly ash will be substantially free of any film formed of these materials.

As will be evident from the data hereinafter set forth, fly ash as such does not possess the novel properties of the product of the present invention.

The material of this invention when obtained by the combustion of pulverized coal represents only a fraction of the raw fly ash from which it is obtained. After screening raw fly ash to remove particles having a particle size greater than about 100 mesh, the present product may be obtained by the method of copending application Serial No. 672,391, filed July 17, 1957, now abandoned. According to the method of this copending application fly ash, from which particles over 100 mesh have been removed, is introduced into a magnetic field which decreases in the mean field intensity with distance from a region of maximum field intensity. At substantially each point in at least a portion of the magnetic field, the field varies in direction with time, the variation in direction comprising a magnetic component rotating about each point. The rotating magnetic component spins magnetic particles in the fly ash with an angular velocity which, upon collision of such magnetic particles with each other with the other particles, imparts a translational velocity to the particles, establishing within the mass of particles an expanded state in which the distance between the particles is great as compared to the size of the particles, and the particles are in turbulent motion. The linear velocity of the particles other than the stated magnetic particles carries them beyond and away from the expanded mass of the stated magnetic particles, which are retained in the magnetic field by the space change in flux density. Preferably the mean field intensity in the region of maximum field intensity is from about 40 to about 80% of the magnetic force necessary for magnetic saturation of the magnetic particles, and the decrease in mean intensity with distance from the region of maximum field intensity is from about 1 to about 5 webers per square meter per meter. Also a mean speed of rotation for the rotating magnetic components of the field of from about 300 to about 4000 radians per second is preferred.

This method of obtaining the material of this invention from the above-described residue of combustion of pulverized coal is extremely advantageous for a number of reasons, but particularly because the previously mentioned film of alkali and alkali metal and alkaline earth metal sulfates on the surface of the particles is not disturbed. Although a preferred method for obtaining the present product is that disclosed in the above-mentioned copending application, it is possible that other types of manufacturing methods may be employed with some success.

The following specific example of the use of the engineering material of this invention in combination with Portland cement is given for the purpose of illustrating the advantageous properties of this material with respect to increased strength and air-entrainment, and is not intended to limit the scope of this invention.

A number of mixes are prepared with ingredients and proportions based on the following table. From each mix a number of 2″ x 2″ x 2″ cubes were prepared and tested for strength according to ASTM C311–54T, sections 19–21, and for air-entrainment according to ASTM C311–54T, sections 28 and 29. The results of these tests are also set forth in the following table:

*Table I*

|  | Mix | | | | |
| --- | --- | --- | --- | --- | --- |
|  | A | B | C | D | E |
| Portland cement (g.) | 500 | 500 | 500 | 500 | 500 |
| Fly ash Y (g.) | 0 | 125 | 0 | 0 | 0 |
| Product of invention [1] derived from fly ash Y (g.) | 0 | 0 | 125 | 0 | 0 |
| Fly ash Z (g.) | 0 | 0 | 0 | 125 | 0 |
| Product of invention [1] derived from fly ash Z (g.) | 0 | 0 | 0 | 0 | 125 |
| Air-entraining agent [2] (g.) | 0 | 0.8 | 0.8 | 1.6 | 1.6 |
| Graded Ottawa sand (g.) | 1,375 | 1,375 | 1,375 | 1,375 | 1,375 |
| Water (g.) | 244 | 240 | 230 | 264 | 245 |
| Flow (percent) | 110 | 107 | 108 | 112 | 110 |
| Compressive strength [3]: | | | | | |
| 7 days | 3,687 | 4,133 | 4,110 | 3,740 | 5,053 |
| 28 days | 5,265 | 5,773 | 6,033 | 5,377 | 6,790 |
| Air entrainment (percent) | 7.2 | 13.9 | 17.8 | 11.2 | 21.0 |

[1] Prepared by the method of copending application Serial No. 672,391.
[2] The sodium soap of a hard, brittle, dark-colored, thermoplastic resin derived from pine wood, and containing phenol, aldehyde, and ether groups. Resin prior to neutralization has a sp. gr. 1.218; M.P. 234–239° F.; flash point, 455° F.; acid No. 93. (1 part by wt. of resin to 10 parts water.)
[3] Average of 3 samples.

It will be noted from the foregoing table that the mixes containing the product of the present invention (C and E, respectively), show substantial reduction in water requirement, substantial increase in strength and less depressing effect on the air-entraining agent than the mixes prepared with fly ash (B and D, respectively), from which the present product is prepared with comparable quantities of air-entraining agent.

It is claimed:

1. A material comprising a non-magnetic fly ash fraction consisting essentially of discrete, substantially sphere-like particles having a particle size less than about 200 mesh and a specific gravity of from about 2.1 to about 2.6 consisting essentially of a glass comprising silica and alumina.

2. The product of claim 1 in which at least about 70 percent, by weight, of said particles have a particle size less than about 325 mesh.

3. The product of claim 1 in which said particles vary in size from about 200 mesh to sub-micron size.

4. The product of claim 1 having a specific gravity of about 2.2.

5. A material comprising a non-magnetic fly ash fraction consisting essentially of discrete, substantially sphere-like particles having a particle size less than about 200 mesh and a specific gravity of from about 2.1 to about 2.6 consisting essentially of a glass comprising silica and alumina, and on the surface of said particles a film selectively to promote reaction between alkali and said glass comprising a water soluble salt selected from the group consisting of alkali and alkaline earth metal sulfates and acid sulfates and mixtures thereof.

6. The product of claim 5 in which at least about 70 percent, by weight, of said particles have a particle size less than about 325 mesh.

7. The product of claim 5 in which said particles vary in size from about 200 mesh to sub-micron size.

8. The product of claim 5 having a specific gravity of about 2.2.

9. A cement composition comprising Portland cement and a material comprising a non-magnetic fly ash fraction consisting essentially of discrete, substantially sphere-like particles having a particle size less than about 200 mesh and a specific gravity of from about 2.1 to about 2.6 consisting essentially of a glass comprising silica and alumina, said sphere-like particles comprising from about 10 to about 40%, by absolute volume, based on the absolute volume of Portland cement plus said sphere-like particles.

10. The cement composition of claim 9 in which said particles vary in size from about 200 mesh to sub-micron size, and at least about 70 percent, by weight, of said particles have a particle size less than about 325 mesh.

11. The cement composition of claim 10 in which said material has a specific gravity of about 2.2.

12. A cement composition comprising Portland cement and a material comprising a non-magnetic fly ash fraction consisting essentially of discrete, substantially sphere-like particles having a particle size less than about 200 mesh and a specific gravity of from about 2.1 to about 2.6 consisting essentially of a glass comprising silica and alumina, and on the surface of said particles a film selectively to promote reaction between alkali and said glass comprising a water soluble salt selected from the group consisting of alkali and alkaline earth metal sulfates and acid sulfates and mixtures thereof, said sphere-like particles comprising from about 10 to about 40%, by absolute volume, based on the absolute volume of Portland cement plus said sphere-like particles.

13. The cement composition of claim 12 in which said particles vary in size from about 200 mesh to sub-micron size; at least about 70 percent, by weight, of said particles have a particle size less than about 325 mesh, and said material has a specific gravity of about 2.2.

14. The cement composition of claim 12 in which said particles vary in size from about 200 mesh to sub-micron size, and at least about 70 percent, by weight, of said particles have a particle size less than about 325 mesh.

15. The cement composition of claim 12 in which said material has a specific gravity of about 2.2.

16. A structural product comprising the reaction product of lime and between about 2 and about 10 parts by weight per part by weight of lime of a material comprising a non-magnetic fly ash fraction consisting essentially of discrete, substantially sphere-like particles having a particle size less than about 200 mesh and a specific gravity of from about 2.1 to about 2.6 consisting essentially of a glass comprising silica and alumina.

17. The structural product of claim 16 in which said particles vary in size from about 200 mesh to sub-micron size, and at least about 70 percent, by weight, of said particles have a particle size less than about 325 mesh.

18. The structural product of claim 16 in which said material has a specific gravity of about 2.2.

References Cited in the file of this patent

UNITED STATES PATENTS

| | | |
|---|---|---|
| 2,250,107 | Nelles | July 22, 1941 |
| 2,553,759 | Geiger | May 22, 1951 |
| 2,564,690 | Havelin | Aug. 21, 1951 |

OTHER REFERENCES

S. Eketorp.: Eng. & Min. J., vol. 152, No. 10, pp. 82, 83, 118, October 1951.

Chemical Engineering News, vol. 59, No. 12, December 1952, pp. 247–248.

UNITED STATES PATENT OFFICE
CERTIFICATE OF CORRECTION

Patent No. 2,987,408                                    June 6, 1961

Leonard John Minnick

It is hereby certified that error appears in the above numbered patent requiring correction and that the said Letters Patent should read as corrected below.

Column 7, line 7, and column 8, line 30, after "alumina", and before the period, each occurrence, insert -- substantially free from crystalline iron compounds --; column 7, lines 20 and 38, and column 8, line 3, after "alumina", and before the comma, each occurrence, insert -- substantially free from crystalline iron compounds --.

Signed and sealed this 14th day of November 1961.

(SEAL)
Attest:

ERNEST W. SWIDER
Attesting Officer

DAVID L. LADD
Commissioner of Patents

USCOMM-DC